US006945146B2

(12) United States Patent
Le Gallais

(10) Patent No.: US 6,945,146 B2

(45) Date of Patent: Sep. 20, 2005

(54) PIPE-CHAMFERING DISK

(76) Inventor: Lionel Le Gallais, Ville Nerac, Richmond Road, la Pouquelaye, St. Helier, Jersey (GB)

( * ) Notice: Subject to any disclaimer, the term of this patent is extended or adjusted under 35 U.S.C. 154(b) by 0 days.

(21) Appl. No.: 09/951,534

(22) Filed: Sep. 14, 2001

(65) Prior Publication Data

US 2003/0051585 A1 Mar. 20, 2003

(51) Int. Cl.[7] .............................. B23B 5/04; B23B 5/16

(52) U.S. Cl. ........................................... 82/113; 407/42

(58) Field of Search ................................ 82/113; 83/54, 83/862, 863, 869; 407/34, 35, 42, 43, 53, 54, 55, 56, 57; 408/227, 228, 229, 211, 226

(56) References Cited

U.S. PATENT DOCUMENTS

| | | | | | |
|---|---|---|---|---|---|
| 1,850,327 | A | * | 3/1932 | Makowski | 82/113 |
| 3,088,352 | A | * | 5/1963 | Tanner | 82/59 |
| 3,431,646 | A | * | 3/1969 | Young | 30/97 |
| 4,333,727 | A | * | 6/1982 | Bennett | 408/191 |
| 4,580,934 | A | * | 4/1986 | McCormick | 408/201 |
| 4,625,464 | A | * | 12/1986 | Kubo | 451/441 |
| 4,641,562 | A | * | 2/1987 | Clarke | 83/837 |
| 5,000,629 | A | | 3/1991 | Nygards | |
| 6,129,488 | A | * | 10/2000 | Fahr | 407/31 |
| 6,481,254 | B1 | * | 11/2002 | Zheng et al. | 70/276 |

FOREIGN PATENT DOCUMENTS

| | | | | |
|---|---|---|---|---|
| DE | 19708686 A1 | * | 8/1998 | B23D/45/12 |
| JP | 9-295219 | | 11/1997 | |
| WO | WO 97/27969 | | 8/1997 | |
| WO | WO 98/16342 | | 4/1998 | |

* cited by examiner

*Primary Examiner*—Henry W. H. Tsai

(74) *Attorney, Agent, or Firm*—Young & Thompson

(57) ABSTRACT

The cutting disk includes cutting teeth for cutting through a pipe prior to engagement with the pipe of chamfering teeth pressed or bent sideways out of the plane of a flat body portion. Each of the chamfering teeth defines a cutting edge angled obtusely away from the plane of the plate and from the cutting teeth so that, in use, after the cutting teeth have penetrated the material of a pipe, the chamfering teeth are configured to cut at least one chamfer angled inwardly towards the plane of the cut.

17 Claims, 3 Drawing Sheets

PIPE-CHAMFERING DISK

BACKGROUND OF THE INVENTION

The cutting and preparation of certain pipes for use (for example pipes of plastics materials for drainage purposes) presents a problem since the pies are bulky and difficult to handle and for many purposes a chamfer or bevel is required along the cut circumference. For example, drainage pipes of plastics materials are often connected to one another by rubber collars or grommets, and a chamfered edge on a pipe is desirable as it facilitates fitting of the pipe in a collar.

SUMMARY OF THE INVENTION

From a first aspect the invention provides pipe-chamfering disk for imparting a chamfer to the cut circumference of a cut pipe which includes chamfering teeth pressed or bent from a substantially flat body portion.

Typically, the chamfering teeth may be pressed or bent sideways out of the plane of the body portion.

The pipe-chamfering disk may be in the form of a cutting disk, for operation with a tool adapted to spin a cutting or grinding disk, such as an angle-grinding tool or the like. Typically, in use, the disk will be used to cut vertically in a plane across the pipe axis.

The disk may be pressed from saw steel, plate steel or other appropriate, typically flat, metallic material. Preferably the disk is tempered or otherwise hardened, Preferably the disk includes cutting teeth for cutting through the pipe prior to engagement of the chamfering teeth with the pipe; and at least one set of chamfering teeth pressed or bent sideways out of the plane of the cutting teeth.

Typically each of the chamfering teeth defines a cutting edge angled obtusely away from the plane of the plate and the cutting teeth so that, in use, after the cutting teeth have penetrated the material of the pipe, the chamfering teeth are configured to cut at least one chamfer angled inwardly towards the plane of the cut.

Preferably, though not necessarily, the pipe-chamfering disk has two sets of chamfering teeth projecting from opposed sides of the cutting teeth, so that the two sets of chamfering teeth produce a separate chamfer on either side of the plane of the cut.

The invention also extends to a pipe-chamfering assembly which includes a line-chamfering disk of the invention as hereinbefore defined in combination with a rotatable sleeve for snugly receiving a pipe and facilitating rotation of the pipe, during operation, by rotation of the sleeve relative to the disk. Typically the sleeve is configured to be rotated manually.

The assembly may include a lock device for checking rotation of the sleeve. The lock device may be in the form of a spring-urged ball detent and a complementary recess within which the ball can engage at a particular datum point in the rotation path of the sleeve.

This assembly may include two sleeves, to permit relative rotation of separate cut portions of a pipe. Thus one portion may be locked while the other is rotated to achieve a clean chamfer against the chamfering teeth of the disk.

The base of the assembly may include sturdy extensions (which may be integral with the base itself) dimensioned and configured to provide stability to the assembly, particularly under conditions of use.

The sleeve(s) of the assembly may be diametrically split and the two halves of each arranged (eg by a pivotal connection of the two halves or the sleeves) to each other) to be separated and married up along the split at will to permit a pipe to be inserted into and frictionally engaged by the sleeve(s).

The assembly may include a drive member for rotationally driving the disk, the drive member being mounted in a comparatively simple arrangement adjacent to the sleeve(s) or in register with a slot in a portion of the assembly, so that the disk can be brought into contact with a pipe held in the sleeve.

A further aspect the invention provides a method of preparing a pipe-chamfering disk which includes the step of pressing or bending chambering teeth sideways out of the plane of a substantially flat body portion.

It is envisaged that the cutting and pressing process for producing the pipe-chamfering disk would be carried out in a continuous pressing process. Thus, the production process may involve consecutive or simultaneous steps of stamping a blank of a cutting disk and pressing the chamfering teeth sideways out of the plane of the blank.

BRIEF DESCRIPTION OF THE DRAWINGS

The invention will now be described further, by way of example, with reference to the accompanying diagrammatic drawings, in which.

DETAILED DESCRIPTION OF THE INVENTION

Figure 1:
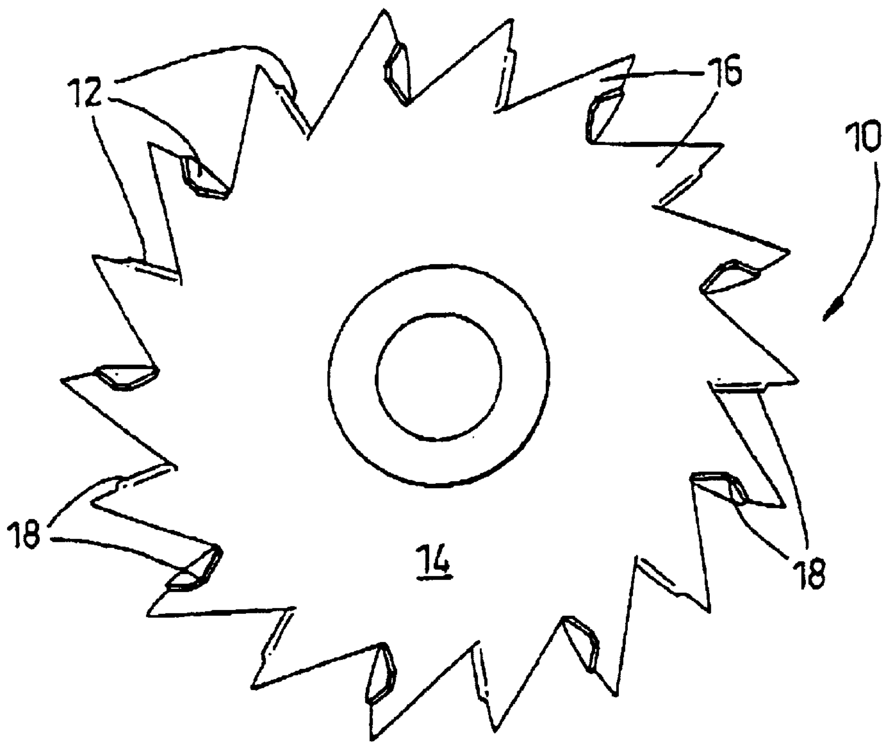
FIG. 1 shows, schematically, a side view of a pipe-chamfering means according to the invention in the form of a pipe-cutting disk.

Referring to the drawings, a pipe-chamfering disk 10 is in the form of a cutting disk and includes chamfering teeth 12 pressed or bent sideways out of the plane of a substantially flat body portion 14.

Cutting teeth 16 are provided for cutting through a pipe prior to engagement of the chaffering teeth 12 with the pipe.

Each of the chamfering teeth 12 defines a cutting edge 18 angled obtusely away from the plane of the plate and from the cutting teeth 16 so that, in use, after the cutting teeth have penetrated the material of a pipe, the chamfering teeth are configured to cut at least one chamfer angled inwardly towards the plane of the cut.

Figure 2:
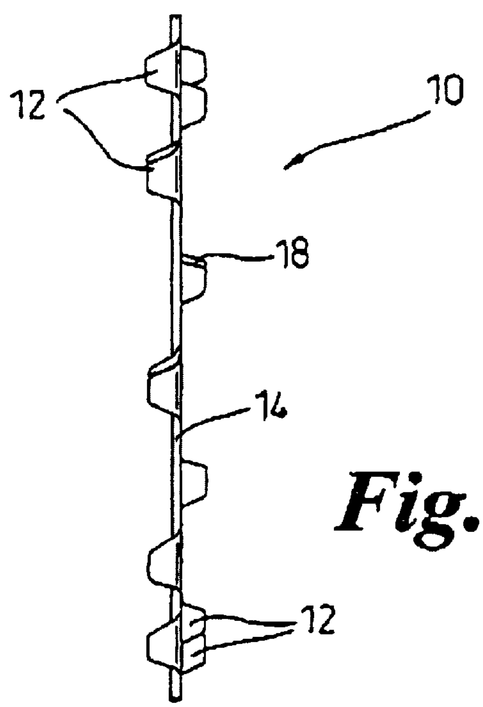
FIG. 2 shows, schematically, an end-on view of the pipe-cutting disk shown in FIG. 1.
Figures 3A, 3B, 3C:
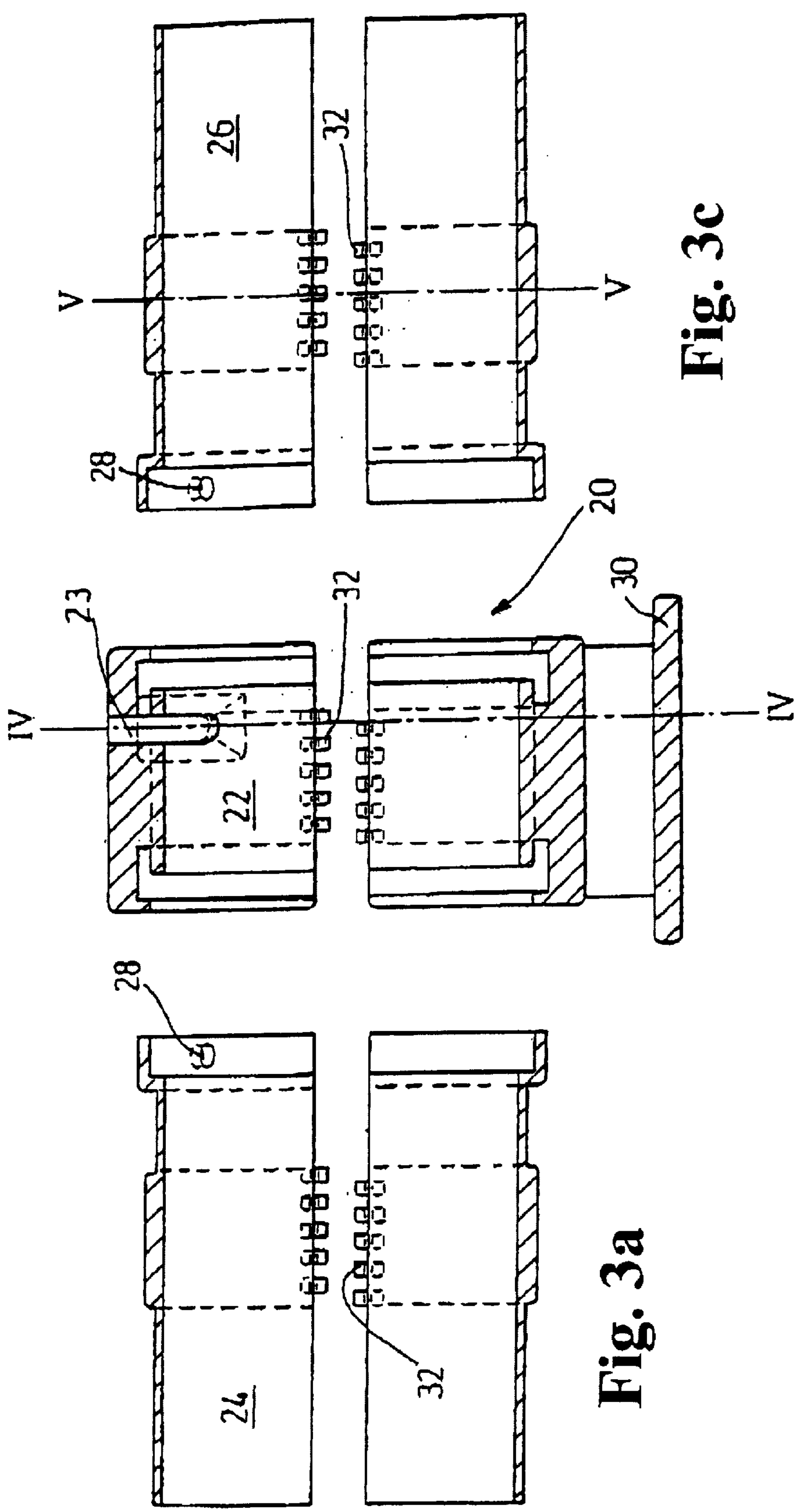
FIGS. 3*a*–3*c* show, schematically, an exploded front sectional view of part of a pipe-chamfering assembly according to the invention.
Figure 4:
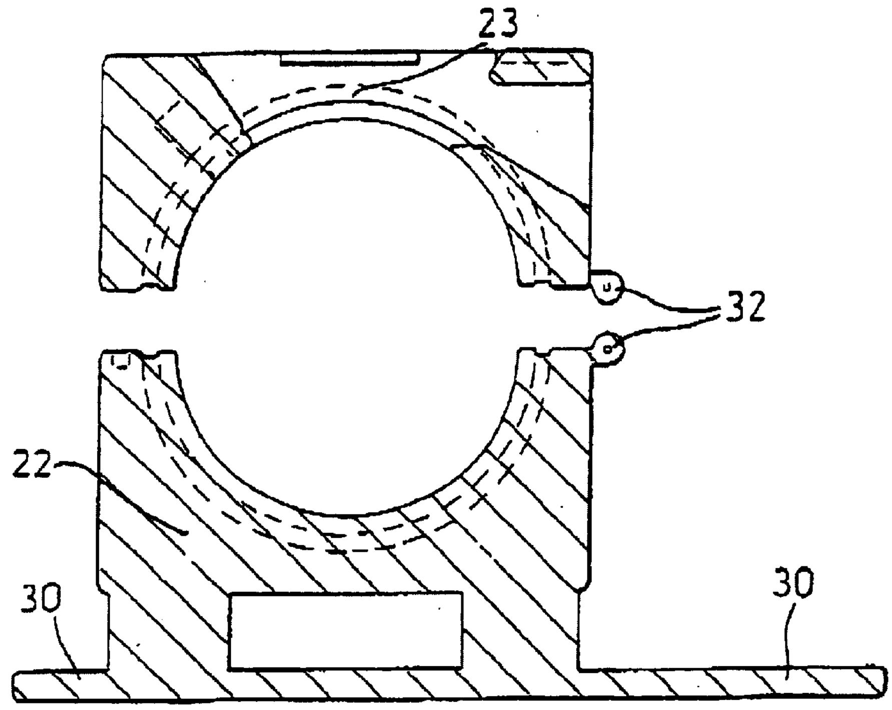
FIG. 4 shows, schematically, a side sectional elevation taken at the line IV—IV in FIG. 3*b*.
Figure 5:
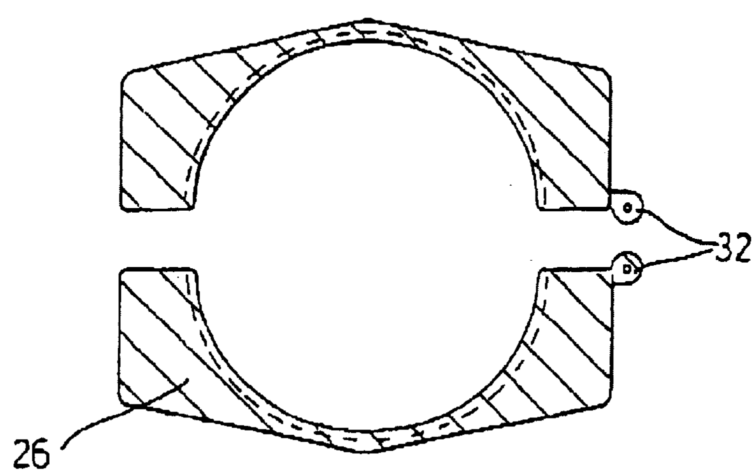
FIG. 5 shows, schematically, a side sectional elevation taken at the line V—V in FIG. 3*c*.

As can be seen in FIG. 2, the cutting disk 10 has two sets of chamfering teeth 12 projecting from opposed sides of the plane of the body portion 14 so that, in use, the two sets of chamfering teeth will produce a separate chamfer on either side of the plane of the cut.

Turning to FIGS. 3*a* to 5, reference numeral 20 indicates generally a part of a pipe-chamfering assembly, shown exploded. The assembly 20 is intended to be used in combination with a chamfering means in the form of a cutting disk of FIGS. 1 and 2 (not shown) driven by a power tool (also not shown) mounted on a central portion 22 of the assembly 20. In use, the cutting disk would protrude down through a slot 23 to engage with a pipe passing through the central portion 22.

Sleeves 24 and 26 are rotatable with respect to the central portion 22. When assembled, the sleeves 24, 26 engage with the central portion 22 in such a way that they may be rotated manually. The pipe to be cut and chamfered is received snugly in the sleeves and is rotated relative to the spinning cutting and chamfering teeth of the cutting disk. Once the pipe has been cut through, one portion of the pipe can be rotated whilst the other portion is held still, to enable chamfering of first one cut edge and then the other cut edge of the pipe.

In order to facilitate holding each separate portion of a cut pipe still whilst the other portion is rotated, the assembly 20 includes a locking device (shown schematically by the circles 28) for checking rotation of the sleeves 24, 26. These circles 28 symbolise spring-urged ball detents (not shown) which engage with complementary recesses (also not shown) at a given point in the rotation path of the sleeves around the central portion 22 to lock the sleeves to the central portion 22.

The base of the assembly 20 includes sturdy extensions 30 dimensioned and configured to provide stability to the assembly, particularly under conditions of use.

As can be seen from FIGS. 3*a* to 5 of the drawings, the sleeves 24, 26 and the central portion 22 are diametrically split and the two halves of each part are arranged by means of pivotal connections 32 to be opened and closed onto each other at will to permit a pipe to be inserted into and frictionally engaged by the sleeves and released after cutting and chamfering.

It is believed that the pipe-chamfering means ("the device") has certain advantages over previous pipe cutting disks. The present device is lighter end less complicated to manufacture, and automation of pressing process can more simply be achieved than with previous designs. Because it is inexpensive and wears out quickly the device is a throw-away item, and sale of the device will provide a certain consistency of income since it will have to be replaced frequently.

What is claimed is:

1. A pipe-chamfering disk for imparting a chamfer to the cut surface of a cut pipe, said disk including cutting teeth and chamfering teeth, the cutting teeth being for cutting through a pipe prior to engagement of the chamfering teeth with the pipe, with a substantially flat body portion defining a plate forming the pipe-chamfering disk and defining the cutting teeth, wherein each said tooth has been formed by pressing or bending the material of said plate sideways out of the plane of that part of the substantially flat plate forming a cutting tooth to create a sideways projecting portion of said plate, the side edge of said projecting portion defining the chamfering tooth so as to provide a chamfering tooth on at least some of the cutting teeth.

2. A disk according to claim 1, in the form of a cutting disk, for operation with a tool adapted to spin said cutting disk.

3. A disk as claimed in claim 1, pressed from saw steel, plate steel or other appropriate metallic material.

4. A disk according to claim 1, wherein each chamfering tooth defines a cutting edge angled obtusely away from the plane of the plate and the cutting teeth.

5. A disk according to claim 1 which has chamfering teeth projecting from opposed sides of the cutting teeth, so as to define two sets of chamfering teeth to produce a separate chamfer on either side of the plane of the cut.

6. A pipe-chamfering disk according to claim 1, wherein the chamfer teeth have opposite outer planar surface and a thickness between the outer surfaces equal to a thickness of the plate.

7. A pipe-chamfering assembly including a pipe-chamfering disk for imparting a chamfer to the cut surface of a cut pipe, said disk including cutting teeth and chamfering teeth, the cutting teeth being for cutting through a pipe prior to engagement of the chamfering teeth with the pipe, with a substantially flat body portion defining a plate forming the pipe-chamfering disk and defining the cutting teeth, wherein each said chamfering tooth has been formed by pressing or bending the material of said plate sideways out of that part of the plane of the substantially flat plate forming a cutting tooth to create a sideways projecting portion of said plate, the side edge of said projecting portion defining the chamfering tooth so as to provide a chamfering tooth on at least some of the cutting teeth, in combination with a rotatable sleeve for receiving a pipe and facilitating rotation of the pipe, during operation, by rotation of the sleeve relative to the disk.

8. An assembly according to claim 7, including a lock device for checking rotation of the sleeve.

9. An assembly according to claim 8, wherein the lock device is in the form of a spring-urged ball detent and a complementary recess within which a ball can engage.

10. An assembly according to claim 7, including two sleeves, to permit relative rotation of separate cut portions of a pipe.

11. An assembly according to claim 7, including sturdy extensions dimensioned and configured to provide stability to the assembly.

12. An assembly according to claim 7, wherein the or each sleeve of the assembly is diametrically split and the two halves of each arranged to be separated and married up along the split at will to permit a pipe to be inserted into and frictionally engaged by the or each sleeve.

13. An assembly according to claim 7, including a drive member for rotationally driving the disk, the drive member being mounted adjacent to the or each sleeve or in register with a slot in a portion of the assembly, so that the disk can be brought into contact with a pipe held in the sleeve.

14. A pipe-chamfering disk according to claim 7, wherein the chamfer teeth have opposite outer planar surfaces and a thickness between the outer surfaces equal to a thickness of the plate.

15. A method of preparing a pipe-chamfering disk, formed from a substantially flat body portion which defines cutting teeth within the plane of the flat body portion, which includes the step of bending or pressing a chamfering tooth sideways out of the plane of at least some of the cutting teeth to create a sideways projecting portion of said flat body portion, the side edge of said projecting portion defining the chamfering tooth, so as to provide a chamfering tooth on at least some of the cutting teeth.

16. A method according to claim 15, involving consecutive or simultaneous steps of stamping a blank of a cutting disk and pressing the chamfering teeth sideways out of the plane of the blank.

17. The method of claim 15, wherein the step of bending or pressing a chamfering tooth sideways out of the plane of at least some of the cutting teeth to create a sideways projecting portion defining the chamfering tooth, produces the chamfering tooth with a lengthwise direction approximately aligned with a radius of the disk.

* * * * *